(12) United States Patent
Mayer (10) Patent No.: US 8,595,495 B2
(45) Date of Patent: Nov. 26, 2013

(54) SYSTEM AND METHOD FOR SECURE COMMUNICATIONS

(76) Inventor: Yaron Mayer, Jerusalem (IL)

( * ) Notice: Subject to any disclaimer, the term of this patent is extended or adjusted under 35 U.S.C. 154(b) by 1048 days.

(21) Appl. No.: 10/907,672

(22) Filed: Apr. 12, 2005

(65) Prior Publication Data

US 2005/0228996 A1   Oct. 13, 2005

Related U.S. Application Data

(63) Continuation-in-part of application No. 10/756,839, filed on Jan. 11, 2004, now abandoned.

(60) Provisional application No. 60/452,362, filed on Mar. 3, 2003, provisional application No. 60/464,171, filed on Apr. 14, 2003.

(51) Int. Cl.
  *H04L 9/32*    (2006.01)
  *H04L 29/06*   (2006.01)
  *G06F 15/16*   (2006.01)

(52) U.S. Cl.
  USPC ........... 713/170; 709/206; 709/209; 713/151; 713/153; 713/154; 713/178

(58) Field of Classification Search
  USPC .......... 713/170, 151, 153, 154, 178; 709/206, 709/209
  See application file for complete search history.

(56) References Cited

U.S. PATENT DOCUMENTS

| 4,106,060 | A | * | 8/1978 | Chapman, Jr. | 358/402 |
| 4,956,863 | A | * | 9/1990 | Goss | 380/30 |
| 5,377,017 | A | * | 12/1994 | Lam | 358/405 |
| 5,974,449 | A | * | 10/1999 | Chang et al. | 709/206 |
| 6,701,440 | B1 | * | 3/2004 | Kim et al. | 726/24 |
| 6,775,696 | B1 | * | 8/2004 | Hansen | 709/219 |
| 2002/0046250 | A1 | * | 4/2002 | Nassiri | 709/206 |
| 2004/0122847 | A1 | * | 6/2004 | Rodgers | 707/102 |
| 2006/0041505 | A1 | * | 2/2006 | Enyart | 705/40 |

* cited by examiner

*Primary Examiner* — Beemnet Dada
*Assistant Examiner* — Kalish Bell

(57) ABSTRACT

A method for secure data communications in fax transmissions and computer network communications comprising a. Allowing the sender to receive confirmation that the receiver received the message without having to rely on the receiver accessing a web site; b. Enabling the sender to prove a message was sent to the intended receiver at the specified time/date; c. Enabling the sender to prove the content of the sent message; d. Enabling the receiver to know that the message originates from the purported sender without need to rely on encryption and digital signatures; e. Preventing the theft of digital signatures based on hardware that contains encryption keys and a surrounding processing in isolation so that malicious software cannot cheat the users by accessing said hardware; f. Preventing forgeries of source addresses of the senders which is applied to the sender's phone number, the sender's email addresses, and/or the sender's IP addresses.

10 Claims, 1 Drawing Sheet

SYSTEM AND METHOD FOR SECURE COMMUNICATIONS

This patent application is a CIP of U.S. application Ser. No. 10/756,839 of Jan. 11, 2004 (which claims priority of from Israeli application 153893 of Jan. 12, 2003 and from U.S. Provisional patent application 60/452,362 of Mar. 2, 2003 and 60/464,171 of Apr. 14, 2003, and from Canadian patent application 2,428,648 of May 3, 2003), hereby incorporated by reference in their entireties, of which priority is hereby claimed.

This application also claims priority from U.S. provisional application 60/561,160 of Apr. 9, 2004, hereby incorporated by reference in its entirety.

BACKGROUND OF THE INVENTION

1. Field of the Invention

The present invention relates to communications where data is being transferred, such as for example through the Internet or through Fax communications, and more specifically to a system and method for increased security over such communications, so that the sender can preferably be sure that the receiver received the message and/or at least is able to prove that he indeed sent it, and preferably the receiver for example can be sure that the message indeed originates from the purported sender. Therefore, this preferably includes also for example a system and method for preventing theft of digital signatures and/or forgeries of source addresses on the Internet, such as for example when sending E-Mail.

2. Background

Although Microsoft recently came up with the slogan of trustworthy computing, real comprehensive security in computers requires solving a few deeper inherent problems, as explained for example in another patent application by the present inventor (Israeli patent application 136414 of May 28, 2000, which became later PCT application WO0192981, and was later continued as U.S. application Ser. Nos. 10/301,575 and 10/644,841). Similarly, there are a few inherent problems in communications between computers and/or between other electronic devices (such as for example Fax machines), which can initiate a similar call for trustworthy communications. These problems are caused mainly by various limitations in the currently employed communication protocols, for example over the Internet, or in Fax transmissions. The two main problems are: Verification by the sender that the user indeed received the message, and verification by the receiver that the purported sender indeed is the one who initiated the message. Both of these features are currently lacking for example in normal Fax communications and in normal email communications.

In Fax communications, for example, unless the receiver can trace the source of the call, the receiver does not know for sure if a Fax transmission indeed originated from the purported sender, or someone for example forged the sender's phone number and/or logo on the head of the Fax. Similarly, unless the sender specifically phones the receiver and requests for example voice confirmation and/or confirmation for example by a return Fax, the sender cannot be sure that the receiver indeed received the Fax or received it properly, or at least cannot prove it in case it is needed later for example in some dispute resolution.

In electronic communications over the Internet, similarly, for example normal email communications allow users very easily to falsify the sender's email address, as happens for example many times when spam (unsolicited junk mail) is sent, or when various viruses, such as for example the Klez worm, spread themselves. This stems from the fact that in E-Mail technology, and Internet technology in general, there are currently no automatic provisions for preventing forgery of source addresses. This allows for example viruses, such as for example the Klez worm, to use for example stolen or fake e-mail addresses in order to pretend coming from other e-mail addresses, thus confusing attempts to track the real sender. For example, there are various incoming-mail server systems that automatically remove this specific Virus when detecting it and also issue a warning to the sender, however, since the sender E-mail address is typically faked by the virus, this message goes to the wrong place (or to nowhere—if the given sender email address doesn't exist at all) and thus has little value and can cause more confusion instead of helping. A similar problem is the fact that spammers (people who send junk e-mail to large groups of irrelevant people that did not ask for it) many times hide behind a bogus e-mail address so that they don't get automatic retaliation by e-mail. An even more severe problem is faking emails from various e-commerce sites, such as for example emails from criminals that can pretend to be for example from eBay, that ask clients for various details and then use that to misuse their accounts there. A deeper issue in preventing the faking of email addresses is preventing the faking of IP addresses, since, clearly, making sure that the IP address is not forged can help considerably for verifying also the email address. Similarly, when sending normal email messages, the user cannot be sure that the receiver indeed received the message and/or if he opened it or read it. Although there are already some solutions to this $2^{nd}$ problem, these solutions still have various remaining problems, so the problem has not been completely solved yet: There are a number of services today over the internet which offer certified email in a way similar to the way that electronic "greeting multimedia cards" are sent—the message itself is sent to a server, and the receiver gets a notification from the server that a message is waiting for him/her, with a specifically generated URL address, and when the receiver goes to that URL he/she can see the actual message, and the server can confirm that the message has been received. U.S. Pat. No. 6,314,454, issued on Nov. 6, 2001 to Sony corporation defines such a service, although it does not describe precisely how the receiver gets the message from the server. Anyway, this method of delivery still has a number of drawbacks: 1. It is more cumbersome than sending a normal message. 2. If the message is a message that the receiver will probably not like to get, he can always ignore the invitation to view the message or deny that he even received it. US pending application 20020046250 by Nick Nassiri adds the use of a central authority that forwards the message to the actual receiver, and can also keep for example a copy of the content of the message, but it has a number of drawbacks: 1. It does not define how the server itself verifies that the end receiver indeed received the message, so it merely pushes the problem one step forward. 2. It is even more cumbersome, since the sender is required to first access the service site and establish a registration account. Clearly a more straightforward and comprehensive solution is needed.

A related problem is the problem of security when using digital signatures. Recent legislation in the USA regards digital signatures as no less obligating than handwritten signatures, and in other countries there are similar legislations in process. One of the biggest service suppliers in this area even bragged that it could take almost infinite time to break the private keys in these digital signatures, but ignored the simple fact that there is no need to break the keys since it is much easier to steal them, for example by a Trojan horse, which can arrive for example by e-mail or for example through a web page, by exploiting various loopholes in browsers and/or in e-mail programs. Since such a signature can be compelling in any kind of contract, including for example wills and huge real estate deals, and can involve "non-repudiation" even if you prove for example that your computer was compromised by a Trojan horse, it is clear that the damage from stolen keys can be enormous. In fact, a recent article by two leading experts—Carl Ellison and Bruce Schneier—in the Computer Security Journal, Vol. 16, Number 1, 2000 (http://www.counterpane.com/pki-risks.html), shows that the PKI (Public-Key Infrastructure) concept is highly flawed and can expose users to extreme danger. In the above other patent application by the present inventor et. al. (Israeli patent application 136414 of May 28, 2000, which became later PCT application WO0192981, we showed that such private keys are not safe without proper automatic segregation and verification upon accessing the keys and/or the communication channels. In this patent I show an alternative method for securing the private keys based on hardware. The idea of keeping the private keys for digital signatures for example on a separate card is not new in itself, but current cards which only store the keys themselves are still vulnerable for example to Trojan horses that can intercept for example the access to these cards from the computer and/or for example initiate an access of their own after such interception.

The present invention solves the above problems by providing various solutions that preferably include improvement of the protocols.

Regarding Fax transmissions, there are a number of possible solutions, so preferably at least one of them is used:

In order to ensure the sender's identity in Fax transmissions, one possible solution is that for example the telephone company's computer identifies automatically Fax transmissions and adds its own identification of the originator's phone number to the transmission. This can be done for example by transmitting this number directly to the receiving Fax machine for example as part of the protocol or as additional protocol, so that the receiving Fax machine can understand this number and can for example add it to the header of the Fax. Another possible variation is that the receiving Fax can automatically identify the phone number of the sender (like in identified phone calls, unless for example the sender has blocked it) and preferably can thus automatically add it to the printed Fax. Another possible variation is that this can be added for example by the phone company's computer to the Fax transmission itself, so that it behaves for example like the first few pixel-lines or last few pixel-lines of the Fax transmission or is added or superimposed over some pixel lines such as for example the first or last few original pixel lines, which has the advantage that no special additional protocols or features in Fax machines are needed. (However, this could be problematic if for example an encrypted Fax is sent, since in that case the few added pixel-lines will not be compatible with the encryption—so in this case one possible solution is for example that the phone company adds an additional non-encrypted transmission with the additional data). On the other hand, preferably the sender also has the option of disabling the sender's number identification. However, in such cases preferably the phone company still enforces at least a regional identification—such as for example the real area code of the sender, so that if for example someone forges the logo of another company or organization, at least he cannot do it with an organization that is in another country or area code, because his real area code will show up, and/or in such cases for example the phone company can enforce identifying at least part of the number (such as for example 2 or 3 of the digits, which can be for example the first digits or any other part of the number), so that this does not enable calling back the sender but gives additional identifying details. Another possible variation is that the phone company's computer automatically identifies if the connection is used for a normal voice communication or for Fax transmission, and if it is a Fax or similar kind of transmission preferably the phone company forwards the number to the called number even if the user has normally a block on identified phone calls when he initiates a normal voice call. Another possible variation is that for example the user can send Faxes through the Internet, and the ISP preferably automatically adds the user's phone number for example according to his ADSL phone number (and/or for example normal phone number, for example if it's a normal dial-up connection) and/or for example according to preferably other hardware identification and/or adds other data such as for example the user's confirmed name, and preferably the ISP adds automatically a digital signature to this, preferably with encryption and time and date stamp. This way the receiver can be even more sure of the sender's identity than in normal fax transmissions, since for example in international phone calls identified Caller ID is normally usually not available. Of course, various combinations of the above and other variations can also be used.

In order to confirm that the receiver indeed received the Fax, one possible solution is that the Fax communications protocol is improved, so that for example each Fax machine automatically sends back a confirmation Fax to the sender if the Fax was received OK, or does it at least if the sender for example requests it for example by setting a "request-confirmation" flag in the sending Fax machine. Of course the confirmation can be sent for example by having the receiving Fax automatically call back the sending Fax, but more preferably the confirmation is done using the same connection that was dialed out by the sending fax, which solves the problem of incurring phone expenses by the receiving fax. The confirmation preferably can include sending back for example one or more or all of the received pages (which is preferably done directly from the receiving Fax's memory, or for example from the hard disk—if the fax machine is for example a fax/modem card in a computer) and/or sending back a serial number of the received Fax (for this preferably each Fax machine has a serial counter which automatically increments by 1 when each Fax is received), and/or sending back for example a digital key, which preferably is based on a unique identifier of the receiving Fax (Preferably a private key), which is preferably converted into another number or numbers, which preferably reflect also the time and the date, preferably in addition to the automatically incrementing serial number, so that it becomes very difficult to be able to fake such a return key. For example, each Fax machine might have one or more unique digital identifier or identifiers (as explained above, preferably a private key) and/or a unique formula for mathematical manipulations on these identifiers as a function of time and date and preferably also of the serial number and preferably also of some identifier of the content. Another possible variation is that the confirmation that the fax was sent and/or that it was received is sent automatically in addition or instead for example by the phone company's computer. Preferably the receiving Fax machine prints the unique confirmation key and/or serial number also on at least one page of the received Fax, so that the receivers also have a good trace of which confirmations were assigned by their fax machine for each message. Another possible variation is that the sending fax also automatically similarly adds is own unique serial number and/or key that preferably reflects also a time and date stamp (for example by some combination of its private key with the time and date), so that the receiver also has a confirmation that the fax sent to him was authentic, for example in case of later dispute. Of course, various combinations of the above and other variations can also be used.

Another possible variation is to use for example one or more trusted authorities and send the Fax through such authority, so that the authority itself preferably automatically sends back to the sender a confirmation of the sender and intended receiver and preferably also of the time and date the Fax was sent (and preferably also of the content of the Fax, so that preferably each return confirmation page is stamped by the authority), and also takes care of forwarding the Fax to the intended receiver. The confirmation from the authority to the sender can be done for example by any of the methods described in solution 2 above, and/or for example through email. When forwarding the Fax to the receiver, the intermediate authority can for example use any of the methods described in solution 2 above, or for example, if the receiving Fax machine does not have such features, continue to attempt sending the Fax again at least for a number of times and/or for a certain time, until normal conventional confirmation is received from the receiving machine that the transmission went through OK and/or for example until confirmation according to any of the variations of the above solution 2 is received, and/or until too much time has elapsed and/or too many attempts have failed. The authority then preferably forwards the confirmation also to the sender (again, for example by Fax or by email, for example if provisions for adding email addresses are added for example to the Fax protocol or for example if the user registers there with his number and gives also his/her email), or for example notifies the sender that transmission was unsuccessful, and preferably keeps a record of that also at the trusted authority's archives. This record may include for example also the content of the Fax itself. This way the user can have a $3^{rd}$ party verified confirmation of the time and date of the transmission, and whether it was successfully also received by the end receiver, and preferably also a confirmation of its content, and the confirmation can be for example in the form of the stamped return Fax, and/or for example in the form of a copy in the authority's database, which can be retrieved upon request also later for example in case of dispute (preferably the copy is kept in the database for at least a few years—for example 7 years). The trusted authority can be for example a government body, such as for example the US postal service and/or for example the phone company itself. Preferably the authority has at least one local branch in each main country so that the fax can be sent to a local number, and preferably the data is then automatically transferred to the branch nearest to the receiver through the Internet. Another possible variation is that the fax machine can be connected to the user's computer in a way that causes it to send the images of the faxed pages directly into the computer so that it can be send directly by email, preferably without having to add a fax card to the computer itself and an additional phone line. This can be done for example by connecting the fax to the parallel port or to the USB and for example adding a function to the fax that allows the user to send the fax-coded images to the computer instead of over phone lines (or for example dialing a special number, such as for example 0 activates this), and then the user can for example send it directly through email to the authority. Of course, like other features of this invention, this feature can be used also independently of any other features of this invention. Of course, various combinations of the above and other variations can also be used.

Regarding digital signatures, there are a number of possible solutions to ensure that the private keys are not stolen for example by malicious software, so preferably at least one of them is used:

In order to ensure the safety of private keys even without a comprehensive generic security system on the computer itself, any separate and preferably detouchable hardware that contains the private keys preferably contains also all the software or firmware for accessing and processing these keys, so that in order to digitally sign and encrypt a document preferably the entire document has to be sent to this hardware and processed by the hardware itself, so the returned output from the hardware is the already encrypted and signed document. This way preferably this hardware is like a black box to any software that can access it from the computer. Preferably the hardware also uses at least one incrementally changing element, which can be affected also for example by the exact time and date, in order to reduce the chance of replay for example by Trojan horses that may intercept the encrypted message. Of course using the hardware preferably requires also typing some, preferably user-chooseable, password or secret number or code, since otherwise the hardware itself might be stolen and used.

In addition, preferably any such hardware has a secure and/or encrypted channel for accessing for example the computer screen or the printer or has an output means of its own, in order to display to the user the correct unencrypted document that is being signed. This is important because otherwise a Trojan horse might for example still intercept the connection with the hardware and then send to it for example a dangerous document to be actually processed, while displaying to the user a totally different document which looks innocent to the user. Another possible variation is that the hardware can indicate for example at least the File size and/or CRC and/or other fingerprints of the file that is being signed and preferably some security software and/or for example a function of the Operating system alerts the user if the file that the user sees on the screen has for example a different fingerprint or other parameters than the fingerprint or other parameters shown by the hardware. Another possible variation the user himself has to compare the fingerprint or other parameters displayed by the hardware with the fingerprint or other parameters displayed by the computer, and in such a case preferably there is no access from the computer to the fingerprint, so that for example no malicious software can steal the fingerprint from the hardware and display that on the computer's screen. Another possible variation is to use a security software that ensures that the user always sees the correct real document on which he/she is digitally signing, which can be used for example also if no hardware for the digital keys is used. This is preferably done by preventing any other software from accessing the hardware and/or the driver and/or software that come with the hardware without explicit permission by the user. Of course, this can be also for example, in addition or instead, a feature provided by the Operating system itself.

As an additional precaution, in order to prevent for example a Trojan horse from "grabbing" a user's authorization, preferably each authorization can be used only once and must therefore be explicitly reapplied in order to sign an additional document. In other words, if for example the user has to connect the hardware to the computer or for example insert some additional detouchable element within the hardware as an act of signing or for example press his fingertip against a scanner, etc., he/she is preferably required to re-do it again each time a document needs a signature, even if the hardware is called repeatedly for consecutive signings. Of course, various combinations of the above and other variations can also be used.

Regarding email transmissions there are a number of possible solutions, so preferably at least one of them is used:

In order to prevent faking of the sender's email, since many outgoing e-mail servers already use a list or range of acceptable IP addresses for deciding if to relay an e-mail message or not (for example the Hebrew University mail servers refuse to relay e-mail messages sent by users who are currently logged in for example through Netvision, and vice versa), similar principles can be used also according to the source e-mail that the user provides. So for example, each such mail server can look not only at the source IP address but also instead or in addition at the "From" field and/or "reply-to" field of the e-mail message that the user is trying to send and refuse to relay the message if the "From field" indicates an email address who's corresponding IP address is beyond the range or list of allowed IP addresses for that server. Of course, this prevents only faking e-mail addresses which are outside the given organization or area and does not prevent using fake sender addresses that are within the organization. So this can only considerably reduce the problem but does not solve it completely. However, this is a very good heuristic solution and very easy to implement, even without any additional changes in protocols. Of course, various combinations of the above and other variations can also be used.

Another possible variation is checking also if the given sender e-mail address actually exists at all—for example by sending a short message to it (Preferably by the 1$^{st}$ email server that receives the outgoing email message) and seeing if there is an acknowledgement or a warning message that there is no such real address. This can be done for example within the organization and/or also with e-mail addresses that are outside the organization, by checking the response of the appropriate remote e-mail server. Of course, various combinations of the above and other variations can also be used.

Another possible variation could be a change in the e-mail protocol, so that for example each e-mail-sending program must use some random code and/or preferably also for example the exact time in milliseconds when the message was generated, and the email server immediately contacts back the sender and asks it to repeat the sent code and refuses to relay an e-mail message if the sender does not respond with the correct answer. This way, if a fake sender address has been used, the sending programs there will not be able to respond with the correct code. However, this solution is more cumbersome, and also is impractical since in most cases where people use e-mail today, they are connected to the Internet for example via a dial-up connection or an ADSL connection, which can change each time they make a new connection, and thus the sender e-mail address that they use is typically some logical address on the incoming mail server of their access provider. Thus the source e-mail address that they use is by definition typically not identical with the identity of the real sending machine. So this stringent method could work only for example when people send e-mail messages through a University mainframe, in which case the sender e-mail address is indeed identical with the sending computer. However, this or similar principles can be used for example for making sure that the user does not use a fake IP address and for similarly preventing malicious programs (such as for example various viruses or worms or Trojan horses) from pretending to be themselves a relaying e-mail server instead of an e-mail client program. Therefore, such a solution, applied to IP addresses, can be used for example in combination with solution no. 1. (Another possible variation is that whenever the user sends an email message the appropriate incoming mail server is automatically informed about it (Of course preferably this has to be allowed only with proper authorization) and thus can respond to the challenge and preferably for example the ISP automatically allows this only to users who are indeed allowed to access it, and/or for example the ISP automatically adds to each outgoing message the defined incoming-mail server, however such a solution is more cumbersome and creates unnecessary limitations on the user). Another possible variation is that the ISP for example automatically adds the user's real assigned IP address and/or the confirmed user identity preferably to all outgoing packets or for example at least to emails (for example instead of or in addition to the original source IP address that is indicated in the packet, but preferably this is in addition, since adding the information is more informative about what went on than replacing it). This way for example packets where the indicated source IP does not fit the IP added by the ISP can be automatically blocked for example by the ISP itself or anywhere along the way. Although there is already a concept called egress filtering, which means that the ISP network prevents packets with a source IP address which does not belong to the network from exiting the network, the egress concept is more problematic since it is not on a per-user basis (and thus cannot stop any user in the network from faking any of the other IP addresses that exist in the network), and also it does not deal with the issue of how to know if the packet originated in the network or was relayed from another network (of course if there is only one gateway to each network this can work OK, but using only one gateway is inefficient, and it is much better to have multiple access points. If multiple access points are used, preferably the route the packet passed is added to the packet, so it can be easily traced where the packet came from on the way). The emphasis on a per-user basis preferably at the end-user nodes solves these problems, but if the user is connected to the Internet for example through a gateway in an organization then preferably the gateway performs these checks and/or adds the correct source IP address, as explained below. Of course, various combinations of the above and other variations can also be used.

Another possible variation, which can further help implement for example solutions 1 and 3, can be used for example in the future IP structure where physical (geographical) IP addresses are used. In a physical address system each server or router can instantly know if any IP address given by the user is real or not according the trace of its route, and thus refuse to communicate with a source that uses an IP address that is impossible (or for example at least extremely unlikely) according to its real position on the Internet. For this, preferably each relay server or router preferably adds its own IP address to each packet as it travels through it, and of course preferably a packet with a fake source IP can be stopped anywhere along the way. This could be done even without such a trace, for example if the nearest router that can spot the forgery drops the packet, however it would be much less reliable since if the packet was not dropped on time by mistake or because the relevant router that could block it was compromised, the next routers might not be able to know anymore that the route is impossible. (Of course, a similar scheme might be used also for example even before geographical IP addresses become the new standard, however in that case the procedure could be more cumbersome and involve keeping for example additional tables, so that for example each router preferably has to keep also a list of all the sources from which it can directly receive packets, and in addition preferably each router has to add its IP address to the cumulative trace of the packet, as explained above). However, with or without geographical IP addresses, there is still a problem that for example any relay server or router on the way that is compromised could be used to "edit" the source IP and/or the route trace in order to make it look OK. Therefore, another possible variation is that preferably for example every router along the way has to add also its unique signature with a time and date stamp which is preferably encrypted and cannot be replayed, and preferably each relayed packet gets a serial number, however that might make it more cumbersome. Anyway, the above variations of being able to catch fake source IP addresses at any stage on the route are very important, since any of the other security measures for preventing source IP address spoofing might still be circumvented for example if various relay or forwarding servers and/or routers are compromised for example by Trojan programs (for example by buffer overflow or other vulnerabilities), and these Trojan programs for example then fake the IP address of that server or router and/or of any packets that travel through it or are generated at it (this would be similar to taking over a post office branch or creating a post office branch that doesn't exist and being able for example to stamp letters with phony stamps of various other branches). In addition, this can help prevent flooding the Internet by packets with fake IP addresses if for example one or more ISPs are compromised or one or more phony ISPs are designed which deliberately break all the rules of outgoing IP address filtering (for example some hackers or organizations in various countries might create such phony ISP connections on purpose). On the other hand, even if a compromised router tries to fake a message's IP source, it will face the problem that if the message was split to small packets (for example 1.5 KB each), then other packets of the same message might go through other routers, and thus if some packets of the same message reach the destination with a different source IP, the forgery can be easily detected. On the other hand, as the Routing efficiency and bandwidth increase, for example if the routers are improved according U.S. patent application Ser. No. 10/375,208 of Feb. 17, 2003 by the present inventor, the typical packet size might be much larger and thus for example short messages (such as for example typical Spam messages) might be sent as a single packet without splitting. On the other hand, such a router would still have a hard time faking a message if for example the improved handshake suggested by Gibson (as described below in clause 6) is used, since it must also intercept the handshake from the target, but that might be sent back by a different router. However, the hackers might for example plant the fake router very close to an SMTP server of a large corporation that they are targeting and thus intercept all the responses sent back by that server during the handshake. Similarly, the hackers might use for example other types of sniffers near an SMTP server of some large ISP and thus know for example the challenge sent back to the faked IP for example during the handshake, in which case it would be easy for the hackers to still respond correctly with the fake source IP address. So the above methods can help to expose and block the fake IP because somewhere on the way the claimed IP does not conform to the real geographical location. However, if for example the fake router itself originates the faked messages with the fake IP source addresses, then the above methods are still not sufficient, since the router can fake a correct trace that will look OK. In order to solve this preferably routers and/or other relay servers have to be authorized for example by one or more central authorities and/or for example by higher members in the geographical hierarchy. (However, even this is problematic since a fake router might also for example fool the authority to authorize it).

Another possible variation is to improve the protocol so that for example the server or client program at the real IP address which the hacker pretended to come from, instead of discarding the attempts of the target SMTP server to talk back to it, preferably sends to the target server a special warning that it did not send for example the previous attempt to connect, and so the SMTP server can immediately know that there was an attempt to forge that source IP address. (This of course can be used also with other types of connections and other types of servers, but the emphasis here is on preventing email forgery). However, if the fake router is very near to the target, this might not help either, since the router can intercept all the packets that are going to the fake IP and drop them after reading them. In order to catch such routers preferably each router on the way has to add a serial number of the packet or message preferably with some encryption and time and date stamp, and thus the target can for example conduct sample tests once in a while with routers on the way to see if various packets indeed passed through them. This stamping can also be used anyway for sending to the sender a confirmation that his message was sent and/or received, as explained for example in the reference to FIG. 2. Another possible variation is that preferably the Gibson handshake (or other connections that involve a challenge) are preferably done by a secure layer encryption which also prevents stealing the exchanged keys during the handshake, so that it becomes much harder to view or change the packets even during the handshake. Of course, various combinations of the above and other variations can also be used.

Another possible variation that can further solve the problem of using a bogus sender e-mail address that belongs to someone else within the organization is that preferably the access provider and/or the e-mail server require the user to list for example up to 3 phone numbers (or any other preferably small reasonable or limited number of allowed phone numbers) which can be used by him/her when connecting to the Internet through that access provider, and preferably when making the connection the phone company automatically provides the access provider with the correct phone number used by the user, and the access provider's server then preferably automatically records the actual phone-number and the IP address assigned for that connection and for example makes sure what e-mails are associated with that phone number. This way if for example a malicious program on the user's computer then tries to access the Internet with a false IP address, the access provider's servers can immediately find that the IP address does not fit the real IP address assigned to that connection and preferably for example block all such packets which contain the falsified IP address and/or log the case and/or notify the access provider's authority, etc. Of course in an organization this can be done also for example, in addition or instead, for example by the gateway computer, if all the computers have to access the Internet through one or more gateway computers. The gateway computer can in this case for example automatically block packets which contain any source IP address that clearly does not fit any of the real IP addresses that exist in the organization, and/or for example the network firewall knows also the exact IP address that is assigned to any computer in the organization and can preferably immediately block any attempt and preferably report any attempt from that computer to send a false IP address, which means that the computer has been compromised for example by a Trojan horse or by a spammer. This can be easily implemented for example if the OS and/or for example the Security System and/or for example the communication device in each computer automatically add the correct IP on every packet that comes out of each computer in the organization. Of course, such automatic adding of the correct IP address for example by the OS and/or the Security System and/or the communication device can be done also for example in normal computers that are not part of a network in an organization. Preferably the phone company's computer automatically identifies if the connection is used for a normal voice communication or for electronic data connection (including if it is for example ADSL or cable TV connection to the internet, etc.) and if it is a data connection preferably the phone company forwards the number to the ISP even if the user has normally a block on identified phone calls when he initiates a normal voice call. This is very important since many computer crimes are committed from stolen accounts. Another possible variation is that, if the phone company cannot provide this service, the user himself has to provide the number used each time (This is less reliable, however in combination with the above solutions it can still achieve good results). Another possible variation is that for example some unique identifier of the user's computer and/or for example of its communication card (and/or for example some smart card that the user has to attach when connecting) is used preferably by the ISP as the unique identifier instead of or in addition to the actual phone number, for example in a way similar to using such unique identification during secure http (https://), except that the identifiers are preferably saved by the ISP also between sessions. This method can be used also in case of connecting to the Internet from mobile devices, such as for example mobile phones or palm computers or portable computers. If the user changes the device from which he communicates with the Internet or changes for example the communications device in it, then preferably he has to explicitly inform his ISP about this and authorize the change. Of course this can be used also for preventing the use of stolen accounts and/or passwords. This way, for example the nearest end-node of the access provider always knows if the IP address used by the software on the User's machine is indeed the correct one assigned to it by the access provider. Within large organizations where users work for example from within a large building, this phone method can also be used, and/or for example any other physical address or fingerprint identifying the machine and/or the specific network connection used. This itself can ensure that IP addresses are not faked, which can be also very useful for example in cases of DDOS (Distributed Denial of Service) attacks, so that the attacked server or its firewall can immediately start dropping packets arriving from the attacking IP addresses, since otherwise an attacking Trojan horse could for example change a faked IP address all the time. This does not by itself prevent faking of email addresses within the organization or within the valid range of IP addresses of the access provider, but it allows for example very easily tracing the user who's computer generated a false email address if it is later determined to be false for example by the receiver of the message. Another possible variation is that each user is allowed by the access provider for example to explicitly provide a list of allowed sender email addresses that can be used from each uniquely identified computer and/or connection and/or phone numbers. Another possible variation is that each time a user's computer sends an email address or uses some IP address it is logged on the nearest access provider's node along with unique identifying data of the computer and/or the connection and/or for example the phone number used and/or the IP address that was assigned to this connection, and if the sender email address changes more than a certain allowed number of times during that session then for example messages with additional sender email addresses are for example blocked and/or the case is logged and/or reported to for example to the access provider authority. (Another possible variation is to do the same also for IP address changes, but as explained above preferably attempts to use the wrong IP address are automatically blocked). Of course various combinations of the above and other variations can also be used.

Another possible variation for preventing faking of source IP addresses is that the first server or node (preferably of the access provider) that the outgoing packets from the user's computer reaches first sends back a short package to the given source IP address and forwards the packets only if the machine at the given IP address confirms that it indeed initiated the outgoing packets. Preferably such confirmation is based on replying to a unique challenge so that only the real originator can respond. However, a malicious program could circumvent such checks for example by pretending to be another server or router or for example an email server. But, since in normal email protocol typically the sending mail server connects directly to the receiving mail server at the domain of the target address without going through other mail servers on the way (so there are typically only routers on the way that relay the packets)—preferably the mail server on the receiver's side verifies the IP of the sender's side server by contacting back the sender's side mail server, preferably with a challenge so that only the real originator can respond, and thus even if the sending client can pretend to be a server, it doesn't help him since attempts to fake the IP address will not work. Another possible variation is for example to perform this check also between at least some nodes on the way, but that would be less efficient. Another possible variation is that normal users that are not running servers are automatically marked by the access provider as end-node and thus attempts to pretend to be a server can be automatically ignored. (Preferably this does not prevent the user for example from running a web server but prevents him for example from running an unauthorized SMTP server or router). This is very easy to accomplish since most access providers for example in Israel do not allow normal users to run servers. Another possible variation is that the access provider identifies if someone runs a real server for example according to its behavior. Another possible variation is that there are also for example one or more email authorities (for example in a way similar to phone companies) in which users can or have to register in order to confirm who they really are and that they are indeed the one who are using that email addresses. Of course various combinations of the above and other variations can also be used. Actually, Steve Gibson has already offered a solution for preventing faking IP source addresses in SYN packets DDOS attacks already in 2000, based on the server adding a random number to the sequence number that is sent by the initiator of the connection, in a way that remains within current TCP/IP protocol rules (so that the protocol doesn't even have to be changed), as can be seen at http://grc.com/r&d/nomore-dos.htm (According to Gibson, IBM later filed a U.S. patent application—20010042200 which is very similar to this). This solution can thus be used in any connection that requires a triple handshake, such as TCP/IP connections, including for example the SMTP connections, and thus IP forgery can be prevented in all of these types of connections. However, as explained above in clause 4, preventing IP forgery might be insufficient in case for example a router or an SMTP server is compromised or faked, so preferably this is prevented for example by any of the above described methods.

Another problem is the fact that when people connect to the Internet for example from an Internet Café, many times they forget to close down open connections and/or at least they leave behind traces such as for example various cookie files, temporary files, history logs, etc. There have already been cases that users who subsequently used the same computer misused this for example to send a false suicide note or to send a false kidnapping message, etc. Although some web based email sites, such as for example Hotmail and Yahoo, allow the user to mark when he/she is using a public computer, this relies on the user marking it and is anyway just a limited solution. Therefore, preferably the OS itself, preferably during installation, enables the administrator to specify that this is a public-use computer, and preferably this setting can be changed only for example with the original installation disk and/or with a password and/or with some other physical key. Preferably when defined as a public computer, the OS itself indicates this in outgoing electronic communications such as for example emails, for example by adding this info at the socket layer, and preferably any session-related traces are automatically removed by the system for example after a short time of inactivity and/or if the user does not re-enter a password chosen by the original person that started the session, or for example such traces are not saved at all. Another possible variation is that in addition for example the OS allows the user to send additional email messages from the same session only if he/she know the password entered or chosen by the user when he/she started the session, etc. Another possible variation is that this is enforced for example instead or in addition by a security software that is installed on the computer.

In order to enable delivery confirmation of email messages, one possible variation is to use one or more trusted authorities like in solution 3 for Fax transmissions. The additional advantage of this is there can be an independent confirmation also of the content of the message, a feature which is lacking even in normal certified mail. This confirmation can be, again, for example in the form of a certified copy returned from the authority, for example with various stamps or signatures, and/or in the form of a record kept at the authority for example for 7 years, in case a later certificate is needed. However, preferably no previous setting of account by the sender at the server is required, and each sender can preferably automatically use the services of the trusted authority by simply using a properly formed message. This is explained in more detail in the reference to FIG. 1. Of course, various combinations of the above and other variations can also be used.

Another possible variation in order to confirm that the receiver indeed received an email message, is that the email communications protocol is improved, so that for example each end-node email server that communicates directly with the final receiver (typically this is the mail server at the domain of the receiver's email address) preferably automatically sends back a confirmation to the sender and/or to the mail server at the sender's side if the email was received OK, or does it at least if the sender for example requests it for example by setting a "request-confirmation" flag in the sent email message. The confirmation that the message was received OK by the receiving server can be for example by the aid of sending also at least one CRC or fingerprint or size data together with the message from the sending server, so that the receiving server can confirm that the message came OK, and/or for example the receiving server also sends back to the sending server a copy of the message it received, so that the sending server can check if it is identical with the sent message. Preferably the copy is sent back with a digital stamp and serial number, like in the case of using a trusted authority. In the existing prior art protocol, the sending server only knows if it succeeded to connect to the receiving server and if the requested address there exists, but not if the message itself was received completely, etc. Another possible variation is that the mail server at the side of the receiver preferably also automatically informs the mail server at the side of the sender and/or the sender directly if and when the receiver's client program actually downloads the message from the mail server at the side of the receiver. This feature is also not done in the prior art. This is explained in more detail in the reference to FIG. 2. Of course, various combinations of the above and other variations can also be used.

Another problem is that many times a messages is received but is simply lost because the user does not notice it among all the dozens of junk emails that most users get each day, which can happen for example if the sender uses a subject that looks somewhat similar to a typical subject of junk mail. In order to prevent this preferably the user can instruct the receiving server and/or for example his email client to mark more conspicuously and/or put in a separate group or list all the emails from a list of senders which the user marks as preferred. Another possible variation is that this group can be generated also, instead or in addition, automatically for example by the email client program and/or for example by the closest email server, for example by putting in the list all the emails to which the user himself sent messages and/or giving them for example a higher position if the user sent more messages to them, and thus automatically messages from email addresses with which the user has already communicated receive automatically higher emphasis than any incoming messages from sources to which the user never sent an outgoing email message or reply. Another possible variation is that the user can for example create similarly a list of email addresses from which he wishes messages to be put in a separate list of suspected junk mails or less important emails or for example to be automatically ignored or deleted, which is of course much more useful in combination with any of the above methods for preventing faking of the sender addresses. Another possible variation is that the sending server keeps a record of messages that were sent out (at least for example subject, sender and receiver) at least for a certain period, and the receiving server and/or the user's client email program can preferably be instructed by the user for example to check once in a while if and when any messages were sent from a certain sender (or list of senders) to the user. This way, for example if the user considers it very important that he does not miss any messages from the USPTO, he can instruct for example the receiving server or his email client to query for example once a week or once a month or once a day the email server (or servers) of the USPTO to download a list of all the messages that were sent to the user, and thus find out if there were any missed messages. If the sending server keeps also the message itself at least for a while then preferably the user can request its automatic resending, otherwise at least he knows that an email was lost and can request it again from the sender itself. Of course, various combinations of the above and other variations can also be used.

Of course, various combinations of the above and other variations can also be used, both within the solutions and across them. On the other hand, many times users have a legitimate need to use a constant or official e-mail address in which they want to use as their representative e-mail address even when actually sending the message from another source. For example they might be sending e-mail from home but they want the sender address to be the address on their Internet site's server (for example using the domain of their site). Therefore, the above solutions must not interfere with this legitimate need. There are a number of possible solutions to this problem, so preferably at least one of them is used:

The sender can use any official sender and/or "reply-to" e-mail address that he wishes, but preferably he/she must include also an additional field which shows the correct e-mail address which was actually used during the sending of the message. (This field can be called for example "sent-via:", or any other suitable name).

The mail server on the user's site allows legitimate users (for example if they have the correct login and password to access it) to define for example various IP addresses that they might use when actually sending the messages (and/or other identification data), and in order to enable this, for example if the outgoing mail server finds that the sender address is not within the allowed range, it can still relay the message for example if it queries the server at the user's site and the server confirms that the actual sender address is listed there, and/or for example any other relay server on the way can decide to drop the message if the source IP is not within the allowed sender IP addresses for that domain. Of course these lists can be maintained for example by DNS servers on each site or for example in one or more central authorities. The lists of allowed IPs can be either the source IPs of the users, and/or for example the IP of the outgoing mail server (for example of the computer where the site resides or of the user's ISP), but in that case each such mail server might have in addition to keep a list of allowed source IP addresses that can connect to it (and/or this server can rely for example only on the user's identification through login and password, but that is less reliable). Preferably for domains which did not define such a list, by default email can be sent only from the IP of that domain itself. However, it turns out that the idea of allowing domains to define the IP addresses of allowed email senders has been suggested already at least on May 28, 2002 by Paul Vixie of the Internet Society and on Jun. 1, 2002 by David Green, as can be seen at: http://ops.ietf.org/lists/namedroppers/namedroppers.2002/msg00656.html and http://ops.ietf.org/lists/namedroppers/namedroppers.2002/msg00658.html. This was later followed by a similar suggestion called RMX (Reversed Mx) by Hadmut Danisch since December 2002, and later by DMP (Designated Mailer Protocol), suggested by Gordon Fecyk since Mar. 27, 2003, and later at the end of 2003 and beginning of 2004 SPF (Sender Permitted From), which tries to combine the advantages of both RMX and DMP, was suggested by Mark Lentczner and Meng Weng Wong from pobox.com. However, as explained above, the deeper issue is avoiding also forgery (spoofing) of source IP addresses, since otherwise even if for example the lists of IP addresses of allowed senders are perfectly implemented (and even this is not so, since there are various problems in implementing this, as explained below), spammers and Trojan horses will simply forge the IP address to fit one of the allowed IP addresses, and, as explained above, many of them are already forging IP addresses anyway (for example in order not to be blocked when performing DDOS attacks and/or in order not to be traced). According to these solutions the problem of email forwarding is solved by either including in the list of allowed IPs also the list of allowed forwarding servers, or creating a new mail header by the forwarding server which indicates that the email went through it. However the following problems still remain in these prior art solutions (even if the source IP addresses are not forged), and they are preferably solved by at least one of the following ways:

In large organizations, such as for example universities (which can have for example a number of main computers, each with one sub-domain, and can have thousands of allowed users for each domain) or with any large access provider (such as for example Bezeq International in Israel, which has hundreds of thousands users, or AOL in the US, which has tens of millions of users), it might not be sufficient to define allowed IPs for sending messages for the entire domain, since any user can still fake the email addresses of thousands of other users. So preferably this is solved by the organization further dividing the allowed sending IP addresses for each sub-domain (for example vms.huji.ac.il will have different allowed IP addresses than mscc.huji.ac.il), and/or forcing each user to define or choose a limited number of source IP addresses that can be used by him/her for sending email with his/her user name at the left side of the '@' with the relevant domain and/or sub-domain of the organization. When these are fixed IPs preferably the organization also automatically checks that no two users have defined or chosen the same IP addresses and if that happens preferably requires authorization that justifies this or declines permission for this duplicity. However this is problematic since it might be difficult to determine in advance which IP addresses are fixed and which are dynamic. But either way, if at least some of the IP addresses are dynamic, a comprehensive solution is needed for that, and this solution is preferably used naturally together with automatically preventing IP spoofing, as described in the solutions in clause d below, since the same mechanism that can associate a user (who preferably has some unique Internet identity) with the current dynamic IP address, preferably automatically also confirms what this IP really is.

In large hosting sites where a large number of domains share the same server or servers (which is the most common solution for most of the sites) there is typically a small number of mail servers that can be used by all the domains that share the same servers, and so for example thousands of users, which each might use at least a few IP addresses, have to be defined. To solve this, preferably the defined allowed IP addresses are per each domain, regardless of the actual mail servers of the hosting service providers, and preferably the IP addresses of these mail servers are not listed as allowed sending IP's for these domains, since that might allow any user who has a web page on that service to send email in the names of other domains there. In addition, preferably all outgoing mail servers have to attach to the message preferably both their own IP address and the IP address of the user who connects to them to send email. Similarly, if for example the IP of the user's ISP's outgoing mail server is listed as allowed sending IP for a certain domain, such a server would still need to know which IP's or users should be allowed to send email for each domain, since otherwise, if the user for example is connected to Bezeq International in Israel and lists this server's IP as an allowed sending IP's for his domain, then any of the huge number of this ISP's clients can send email in the name of that domain whenever they connect to this server to send outgoing email. Another possible variation is that the domain owner can list the IP of the outgoing mail server or servers that he/she and/or his/her allowed users use to send email (for example of the user's hosting service or of the user's ISP) in the list of allowed sending IP addresses for a certain domain together with a list of allowed usernames, so that for example only one or a few users on that mail server can send email in the name of that domain. However in order to enforce this, preferably either the outgoing mail server itself has to check in the list of the relevant domain if the user is allowed to send email under that domain, or the outgoing mail server for example has to add the user name to the header of the message, so that it can be checked also later.

Defining allowed forwarding servers per sending domain is impractical, since for example any receiving email account for example on Unix machines can be reconfigured to forward the mail, so the sender does not know what target email addresses are actually used to forward the email to another address. Therefore a better variation is that the receiver for example can define allowed forwarding IP addresses or domains, so that for example the user can tell the receiving email clients to ignore any email from unauthorized forwarding domains or IP addresses. However, like with the problem of fake routers, there can be for example fake SMTP servers that connect to other SMTP servers as relays or fake forwarding servers (and since an SMTP server deals with complete messages, there is no problem that some of the packets might go through another router as in the case of fake or compromised routers) and thus for example a phony or compromised SMTP server can claim for example that it received various email messages from any IP address that it desires (directly or through a faked list of other SMTP servers) and thus for example initiate Spam that appears to come from somewhere else. In the case where an SMTP server delivers the email through another SMTP server the user cannot know in advance which servers will be used. In order to solve this preferably SMTP servers have to be authorized for example by one or more central authorities and/or for example by higher members in the hierarchy if for example a geographical hierarchical system is used, and/or preferably such fake servers are prevented from faking their own IP address by any of the methods described above, and they can preferably be easily discovered for example by any of the above described methods (preferably in the same ways described above for catching faked or compromised routers).

Users that are not constantly connected with a fixed IP address may get each time they connect a different IP address (for example when using normal dial-up or when using a typical ADSL service, since typically the user gets each time a different IP address when connecting through the ADSL dialer), so this has to be taken into account automatically in a smart way. A related problem is the problem of users who have to connect from different places—for example both from work and from home, and/or when traveling, for example with a portable computer or even from an Internet café. Preferably in order to handle these problems whenever the user connects to the web preferably some software on his computer preferably automatically connects him to the appropriate servers in each of the related domains (or for example special DNS servers), preferably using his login and password, so that preferably his current IP address is automatically updated there. However, this process might be cumbersome especially if there are a number of such domains per user, and also if the logins and passwords are used automatically, this can also make them vulnerable to theft if for example some Trojan horse compromises the user's computer. Another possible variation is that for example, instead of or in additions to IP addresses, the list of allowed senders for each domain can include for example also other identifying data, such as for example the ADSL phone number and/or normal phone number that the user uses to connect to the Internet, and/or for example any unique hardware and/or for example a unique smart card that identifies each user, and thus for example when the user connects to the Internet his current IP address only has to be updated automatically preferably on some central DNS-like table or tables which connect between the user's unique identity to the current relevant IP address. This has already been suggested by the present inventor for example for improving IP telephony, in Canadian application 2,457,969 of Jan. 14, 2004. If this automatic dynamic linking between the current IP address to the unique internet identity of the user is done for example automatically by the ISP (based for example on the user's ADSL phone number and/or for example some hardware in the user's computer and/or communication card and/or for example some smart card and/or for example the login with user name and password), then this can also be used at the same time as a method to prevent forgery of the source IP, since, as explained above, if the ISP for example also automatically adds the assigned IP to all outgoing packets (for example both in cases of fixed IP and in case of dynamically changing IP each time the user connects) and/or links the user's Internet ID for example in some special DNS tables to this assigned IP then this constitutes $3^{rd}$ party confirmation of the true IP. Another possible variation is, as explained in clause b above, to list the IP of the outgoing mail server together with the allowed user name or user names that can send from there email in the name of the desired domain or domains. This solves the problem since in this case the user only needs to login to the outgoing mail server with his user name and password, and can do so preferably from any place. However, this login is preferably based on Secure Layer, otherwise sniffing the user's login and password could allow anyone to use his as a hole to send email under the relevant domain or domains.

Of course, various combinations of the above and other variations can also be used, both within the solutions or clauses and across them. Of course, the above principles are not limited only to e-mail messages, but can be used also for example for preventing using telnet from fake IP addresses, or for example for preventing using digital signatures from IP addresses that are outside a range or list of allowed IP addresses, for example as supplied by the owner of the digital signature. This way, for example, no one can use a stolen digital signature from another place. Preferably in all of the solutions where a confirmation is sent back to the user by a trusted authority or by servers along the way, the party that sends the confirmation preferably also confirms for example by any of the above methods that the sender indeed received the confirmation or at least is able to send again the confirmation if the sender requests it.

Also, the above solutions can still allow people to use anonymous addresses by using for example the e-mail services of public sites that allow anyone to open an e-mail box online and send e-mails from there, such as for example hotmail.com or yahoo.com, except that at least some of the above solutions can also be used to enforce that an email sent for example from user1@hotmail.com will not use as the sender field the fake email address of for example user2@hotmail.com or any other e-mail address outside that system.

Another possible variation is to create various combinations with conventional postal services, such as for example certified mail based on leaving only "the last miles" to hand-delivery. This way, for example, preferably the certified email message or Fax is automatically relayed for example to a post-office branch which is near or nearest to the receiver's Physical address, and is printed and hand-delivered from there like an ordinary certified mail, except that the whole process can be of course much faster than ordinary certified mail. This is preferably used in combination with IP addresses that contain also physical addresses, preferably based on a Hierarchy, as explained for example in U.S. patent application Ser. No. 10/375,208 of Feb. 17, 2003, by the present inventor. However, until such physical IP addresses are implemented, preferably matching is automatically done for example by using the physical address of the receiver and automatically matching it with the near post office branch, for example by a combination of country, city and zip code.

Another possible variation is using various combinations between Fax and email messages, so that for example certified communication can be sent to the trusted authority for example as email messages and converted there to Fax communications with the receiver, and/or for example certified communications can be sent to the trusted authority for example as Fax messages and converted there for example to email communications with the receiver, etc.

Of course various combinations of the above and other solutions can also be used. Some of above receipt-verification features may be used for example if the user specifically requests certified communications, or for example automatically even without requesting it, or for example automatically for basic verification and based on user request for more intensive verification, so that for example the basic verification is sending back from the last server or router or node that communicates directly with the receiver at least a confirmation serial number and/or time and date stamp and/or digital key (that preferably contains also the time and date and serial number of the message and some unique identifier of the server).

Another preferable variation is that for example when Faxes are received directly into the computer by a fax card, preferably the Fax program and/or the Operating System (OS) is improved so that if for example a fax-transmission has been cut-off because of some error and the sender wants to send again only the remaining pages, preferably the program and/or the OS can automatically identify this (for example by identifying that this is the same source and within a short time after the previous fax), and then preferably the continuation fax is appended to the end of the previous fax and/or the program at least groups them together and/or notifies the user that two or more faxes appear to be a continuation of the same fax from the same source. Another possible variation is that the receiving fax card can for example automatically return to the user (preferably by improving the communication protocol so that this feedback is received without having to call back the user) a unique return code that preferably includes a time and date stamp and a serial number of the communication (as described above), and preferably the user can add this code on the continuation of the fax, for example preferably digitally (if the fax is sent from another fax card, or for example as an additional code at the end of the dialed phone number if the protocol is improved to enable this), or for example as a printed number at the top of the first continuation page, together with a code that indicates that this is a continuation (in which case preferably OCR is used to identify this). Another possible improvement is that if the user for example sends by mistake in a normal fax machine or for example a combined fax-scanner-printer a page that is with the printed side facing away from the side that is scanned (unless for example if it is a double-side fax that can read both sides of the page simultaneously), preferably the system automatically warns the user that the page is empty on the scanned side. Another possible improvement is that if the user has for example a combined fax-scanner-printer connected to the computer, preferably the OS is able to send faxes also directly through the attached fax-printer by sending it the data and telling it send is as fax instead of printing it. That is preferably done together with an appropriate enhancement in the attached fax-printer. The page can be converted to a fax image in this case for example by software in the OS or by the fax-printer itself. This has the advantage of better quality than scanning a printed page, and is useful for example if the computer does not have a modem/fax card installed in it or if the external fax/printer is faster than the fax/modem card.

Another preferable improvement is that preferably if the user for example uses an email address provided by the ISP and then changes his ISP and wants to keep the email address that he had at that ISP, preferably there are special DNS servers or other servers or normal DNS servers that enable defining a logical or virtual email address, in a way similar to a domain name, but preferably specific for email and with the username at the left side of the '@', so that any email intended for such address will preferably automatically be resolved to the actual IP of the user's new email address. In the prior art the only solution would be email forwarding at the original domain, which means that the email must first go to the original domain and then be sent again to the forwarded address, which means that for example with lengthy email or multiple emails this causes extra traffic and load on the forwarding server. On the other hand the present solution is much more efficient since it preferably only requires going once to the DNS, the same as it would for sending a normal email to some domain name. This is preferably accomplished by registering the special virtual email address in a way similar to registering a domain, which can cost for example $8-20 a year, except that in this case the IP address listed in the DNS is preferably the IP address of the new email and in addition the DNS (or other relevant server) preferably returns also the user name of the new email address. (So if for example the user's original email way john@012.net.il and the user moves to bezeqint and his new email is john1@bezeqint.net, then the special server will return for john@012.net.il the new user name john1 plus the IP address of bezeqint.net). Preferably users can register such virtual email addresses only with permission from the domain owners or for example only the domain owners and/or administrators and/or technical contacts etc, can register it for the user. Of course in order for this to work preferably the protocol is changed so that email sending programs preferably first check if an email address exists as a virtual email in the DNS or other relevant servers, and only if it does not exists then the program requests the DNS or other server to return the IP address of the domain itself and then sends the email normally to the user in that domain (However, since these are preferably the same DNS servers that are used for resolving domain names, another possible variation is that the email sending program can for example give the DNS server the complete email including user name, and if it is a virtual email then the server returns the new username and the IP of the new domain, as described above, and if it is a normal email then the server preferably simply returns the same user name and the IP of the given domain). Preferably the domain owner can charge the user considerably less for allowing him to use the logical virtual email than from what would be charged for actual email forwarding. Another possible variation is that for example ISPs are required by law to let users have such an option, at least for a certain time after the user leaves the ISP and/or for example at least if the user has not been thrown out by the ISP for example because of inappropriate behavior, such as for example spamming. For sending email from such a virtual email address preferably the user has to define the allowed sender IP addresses (and/or other methods of identification as explained above), in a way similar to what preferably has to be defined for each domain.

Another preferable improvement is that preferably the user is warned automatically for example by the browser and/or by the email client if an http link (for example in a web site or in an email message) is trying to deceive him. For example there are email messages that pretend to come from PayPal and tell the user that someone unauthorized has accessed his data and invite him to click on a link in order to check his data, and the visible link says https://www.paypal.com but the real link within the href is somewhere else. So in such cases preferably for example the browser or the email client automatically indicates to the user preferably in a conspicuous manner (for example by flashing the real link within the href) that the real href is different, or for example warns the user about this after he clicks on the link and gives him a chance to cancel before actually going to the link. However, the visible link might just say in this example for example "Paypal" without the full url, in which case it is more difficult to be sure of the attempt to mislead the user, so another possible variation is that preferably for example the browser or email client automatically indicates to the user also the real url that is within the href (preferably in the normal display of the page). This is important because even though the user might discover the deception after clicking on the link, this is still dangerous, because the link might for example point to a site that contains hostile code that takes advantage of some vulnerability for example in the browser or in some pluggin and thus can compromise the user's computer and for example steal or destroy information or plant a Trojan horse. Of course, a generic security system such as for example described in the above mentioned PCT application WO0192981 and U.S. application Ser. Nos. 10/301,575 and 10/644,841 provides ample protection against any such threats, however it is still a wise policy to warn the user in advance about such attempts to mislead him. Also, there have been attempts for example to use unreadable characters in the url that appears in the location window (for example http://www.microsoft.com[special character].hackersdomain.com), so that for example Internet Explorer will display the url only up to that character, and thus the user might not discover the deception even after clicking on the link. Although Microsoft has fixed this specific bug, other ways to display a phony url in the location window might be discovered later. So, in addition, preferably the browser automatically makes sure that the url in the location window is indeed displayed exactly like the actual url that it connects to, and if there are for example unprintable characters then preferably they are marked with some sign and do not effect the printing of the rest of the url, and if there is for example any attempt by javasrcipt or for example Active-X or for example some other portable code (or for example by any other program on the user's computer), to put for example other data on top of the location Window (for example by fitting another small window that appears exactly on top of the location Window), then this is preferably automatically prevented for example by the browser and/or the OS and/or the computer's Security System, for example by automatically preventing other programs from putting any windows in front of the browser window unless the user explicitly transfers the focus to them, and/or for example by automatically intercepting windows that have a suspect size or shape or location or that otherwise have suspicious or unusual qualities.

Another possible variation is that for example the protocols are improved so that the sender can for example send something like a ping or other preferably very short code that only asks (preferably the server at the relevant domain) if a certain email account exists or not. This can thus save on unnecessary traffic and bounce backs, especially if the intended message is long. This has the further advantage that this test has to be sent from the correct IP, otherwise the sender will not get the reply.

Of course the various methods described in this application can be used for a huge number of applications, including for example reliable electronic submission of patents with or without the need to use digital signatures, electronic transfer of priority documents between patent offices worldwide, without the need to print anything, legal correspondence, more reliable transfer of secret or sensitive information, etc.

IMPORTANT CLARIFICATION AND GLOSSARY

All these drawings are just or exemplary drawings. They should not be interpreted as literal positioning, shapes, angles, or sizes of the various elements. Throughout the patent whenever variations or various solutions are mentioned, it is also possible to use various combinations of these variations or of elements in them, and when combinations are used, it is also possible to use at least some elements in them separately or in other combinations. These variations are preferably in different embodiments. In other words: certain features of the invention, which are described in the context of separate embodiments, may also be provided in combination in a single embodiment. Conversely, various features of the invention, which are described in the context of a single embodiment, may also be provided separately or in any suitable sub-combination. SMTP stands for Simple Mail Transport Protocol. MIME stands for Multipurpose Internet Mail Extensions. Typically email is sent between email servers through SMTP or MIME protocols, and the connection between the receiver's client program and the receiving email server is typically through POP protocol, which stands for Post Office Protocol. Throughout the patent, including the claims, "mail server" or "email server" means a server that sends or receives email messages. "Email" is the standard term for electronic messages, although in the future it might include for example also photonic messages if the computers and communications become all-optical. ISP stands for Internet Service Provider, which means the companies that provide the users with physical access to the Internet. Throughout this patent, including the claims, the term "IP address" is just used for convenience, and similar principles can apply to any scheme of internet addressing that will be used in the future, even if for example in the future Internet addresses will be called something other than IP addresses

DETAILED DESCRIPTION OF THE PREFERRED EMBODIMENTS

All of descriptions in this and other sections are intended to be illustrative examples and not limiting.

Figure 1:
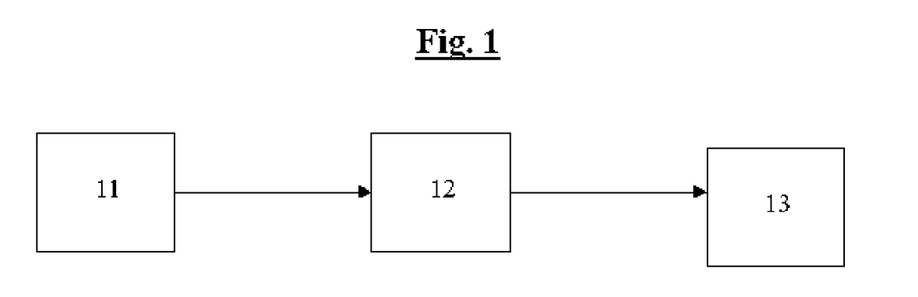
FIG. 1 is an illustration of a preferable example of a configuration using a trusted authority for verifying the receipt and preferably also the content of an email or fax message.

Referring to FIG. 1, I show a preferable example of a configuration using a trusted authority for verifying the receipt and preferably also the content of an email or fax message. The email message from the user's computer (11) goes through the trusted authority (12) on the way to the receiver's computer (13). The additional advantage of this is there can be an independent confirmation also of the content of the message, a feature which is lacking even in normal certified mail. As explained in the patent summary, this confirmation can be for example in the form of a certified copy returned from the authority, for example with various stamps or signature, and/or in the form of a record kept at the authority for example for 7 years, in case a later certificate is needed. The confirmation itself can be sent for example by a stamped return FAX or digitally signed email. However, preferably no previous setting of account by the sender at the server is required, and each sender can preferably automatically use the services of the trusted authority for example by simply using a properly formed message. The authority itself preferably automatically sends back to the sender a confirmation of the time and date the email was sent (and preferably also of the content of the email, so that preferably the return confirmation email is digitally signed by the authority), and also takes care of forwarding the email to the intended receiver. When forwarding the email to the receiver, the intermediate authority can for example use any of the methods described in this invention to verify that the receiver indeed receives the message, and, if the receiver has not received it, preferably continues to attempt sending the message again at least for a number of times and/or for a certain time, for example until confirmation according to any of the above variations is received, and/or until too much time has elapsed and/or too many attempts have failed. The authority then preferably forwards the confirmation also to the sender, or for example notifies the sender that transmission was unsuccessful, and preferably keeps a record of that also at the trusted authority's archives. Another possible variation is that the trusted authority delivers the message to the user by the "greeting card" method described above, or for example tries to use the "greeting card" method only if normal confirmation (for example by any of the other methods described in this invention) is not received for example within a certain time and/or after a certain number of attempts to resend the message. The confirmation record may include for example also the content of the email itself. This way the user can have a $3^{rd}$ party verified confirmation of the time and date of the message, and whether it was successfully also received by the end receiver, and preferably also a confirmation of its content, and the confirmation can be for example in the form a stamped return Fax and/or digitally signed return copy of the sent email message, and/or for example in the form of a copy in the authority's database, which can be retrieved upon request also later for example in case of dispute. Another possible variation is that the authority saves for example one or more CRCs and/or other types of fingerprints of the message that can be used for proving what the content was, without having to save the full content itself, which can thus save a lot of space on the authority's database. Another possible variation is that the authority for example charges a smaller amount for saving only the CRC's (and/or other fingerprints of the content) and a larger amount for saving the full content (and/or charges for example depending on the size of the content that has to be saved). The trusted authority can be for example a government body, such as for example the US postal service and/or for example any online legal or trusted authority. Preferably payments for the authority's services can be done for example by adding an appropriate header (or other element or part) to the message, so that no special account-setting is needed for that, such as for example by giving preferably encrypted credit card info, or paying for example by small micro-payments credit points, for example by automatically adding it directly to the regular ISP bill, or for example payment can be done later when the authority gets back to the sender. Also, preferably the email protocol is improved to allow secure email that preferably contains unique parameters of the sender's computer or connection, which are preferably sent encrypted in a way similar to a secure access to a web page (https:// . . . ), or for example S/MIME is used, which already does something similar. This is preferably done by creating some bi-directional link between the sending computer and the receiving mail server. Of course, various combinations of the above and other variations can also be used.

Figure 2:
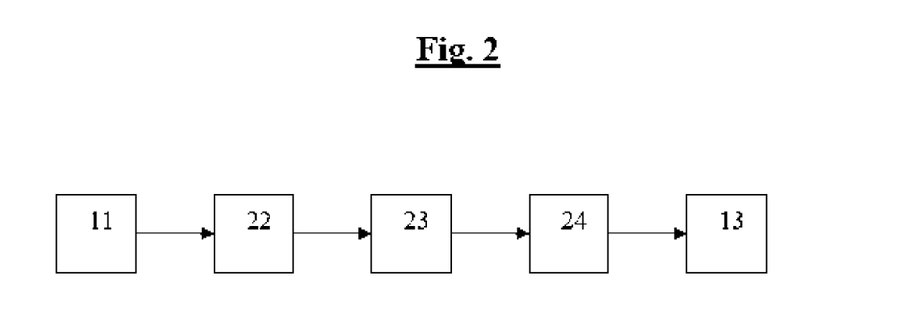
FIG. 2 is an illustration of a preferable example of using for example mail servers or routers along the way for verifying the receipt and preferably also the content of an email or fax message.

Referring to FIG. 2, I show a preferable example of using for example mail servers and/or routers and/or other types of nodes along the way for verifying the receipt and preferably also the content of an email or fax message. In this example for example various email servers and/or routers (22-24) between the user's computer (11) and the receiver's computer (13) can be used for verifying the receipt. Preferably the email communications protocol is improved, so that for example the end-node email server or router (24) that communicates directly with the final receiver (13) (typically this is the mail server at the domain of the receiver's email address) preferably automatically sends back a confirmation email to the sender and/or to the mail server at the side of the sender (11) if the email was received OK, or does it at least if the sender for example requests it, for example by setting a "request-confirmation" flag in the sent email message. The confirmation preferably can include sending back for example a digitally certified copy of the email message and/or at least part of it and/or sending back for example some serial number of the message preferably with a time and date stamp and/or a digital key, which preferably is based on a unique identifier of the server or router (for example some private encryption key), which is preferably converted into another number or numbers, which preferably reflect also the time and the date and preferably also the serial number of the message, so that it becomes very difficult to be able to fake such a return key. For example, each server might have one or more unique digital identifier or identifiers and/or private encryption key and/or a unique formula for mathematical manipulations on these identifiers as a function of time and date. Another possible variation is that the return key includes for example also identifiers for the content, such as for example one or more CRCs and/or fingerprints that can be used for confirming that what the content was. Another possible variation is that the server can for example save a copy of this CRC or CRCs or fingerprints at least upon request for example for at least a certain time period. Preferably for example the unique private key of the server prevents forgery of the receipt, so that knowing the secret key is required in order to be able to create the proper receipt at the given time and date and preferably with the correct fingerprints. This can prevent the need for keeping a log of these confirmations on the mail server. Another possible variation is to keep a log anyway, preferably with the serial number of each message, at least for a certain period, in order to even further reduce the risk of forgery and in order to enable the sender to request a copy of the confirmation also at a later time, for example in case of dispute. However, since preferably only fingerprints of the content of the message have to be saved in this log and not necessarily the entire message, this does not take too much space on the server. Another possible variation is the sending email server similarly also adds its own confirmation key and/or time and date stamps and/or serial number, so that these can be used by the receiver as a confirmation about the content of the message that was sent to him for example in case of later dispute. Preferably the mail servers and any trusted authorities are protected by a powerful security system that prevents hackers from breaking into them and stealing for example their private keys or tempering with their logs, such as for example the security system described in the above Israeli patent application 136414 of May 28, 2000, which later became PCT application WO0192981. Preferably the logs of these servers and similarly of the servers of a trusted authority, if such authority is used, are also constantly or regularly, preferably automatically and incrementally, backed up offline, so that even if hackers succeed to break into the server they cannot temper with the offline records. Another possible variation is to use a similar confirmation for example also from relay mail servers or routers or other types of nodes or servers along the way and not only the last one, except that preferably in this case only confirmation keys are sent along the way and preferably at most only one return certified copy of the email is sent back to the sender. However, this is typically unnecessary, since usually the mail server on the side of the sender connects directly to the mail server on the side of the receiver, without any intermediate mail servers, with only routers that forward the packets along the way. Another possible variation is for example to change the email protocol so that for example the last server or router that communicates directly with the receiver can query or always queries the receiving end-node after sending the message, and the receiving end-node either answers that it received it or that it didn't, and preferably if no answer is received, the last sending node keeps trying at least for a certain number of times and/or a certain period. Another possible variation is that the original server of the sender or any other server along the way can send the request for acknowledgement to the receiving node and wait for the confirmation. Preferably the acknowledgement also contains some unique identifier and serial number of the message and some manipulation on the time and sate stamp. Another possible variation is that the mail server at the side of the receiver preferably also automatically informs for example the mail server at the side of the sender and/or the sender directly for example when the receiver's client program actually downloads the message from the mail server at the side of the receiver. Another possible variation is that either the trusted authority, if such an authority is used, or for example the final server before the receiving node (typically this is the mail server at the domain of the receiver's email address) or for example the sending mail server, preferably encrypts the mail and sends in to the receiver so that the receiver gets a "Closed envelope". When the receiver wants to read the message, preferably the email client program automatically downloads an opening key from the relevant server, and this way the server can know for sure that the message has been read and can send back the confirmation to the sender. This way the message itself does not have to be saved in the server (or for example on the trusted authority's server if a trusted authority is used), and the receiver does not have to go explicitly to receive the email from some server, unlike the "greeting card method". Although this encryption can also be done in addition or instead for example by the receiving mail server, preferably it is done by the sending mail server, which has the further advantage that the message is encrypted on the way between the sending server to the receiving server, thus guarding it also from tempering along the way between them. However, as explained above in other variations, preferably the server saves at least also one or more fingerprints of the content and can send it back to the sender for example upon request and/or automatically as part of the serial confirmation code. Another possible variation is that the receiving email client automatically downloads the key from the relevant server as soon as the message is received without waiting for the user to request to open the message, which has the advantage that the user can for example first download all the messages and then read them offline. Another possible variation is more generally that the email protocol is changed so that the receiving mail server has to send some kind of acknowledgement to the sending server any time during the transmission of a message before the transmission is considered complete, such as for example at the beginning, in the middle, and/or in the end, and if it is not received preferably the server continues to try to send it at least a certain number of times or for a certain period. Preferably at least two confirmations can be sent: One when the message is received by the receiving mail server, and the other when the user opens the message for reading. Another possible variation is that the mail server at the side of the receiver preferably also automatically informs the mail server at the side of the sender and/or the sender directly when the receiver's client program actually downloads the message from the mail server at the side of the receiver. Preferably the sender and/or the sending server can also query the receiving mail server if the message has been downloaded by the receiver's client program, for example in case this notification has not reached the sender because of some error along the way. This is another reason why preferably a log is also kept on the receiving server, since otherwise if for example the server keeps new mail messages for only two months, without a log which is preferably kept for longer times, after two months the receiving server might not know if a deleted messages was deleted because the client downloaded it or because it expired. If the mail server is for example on a Unix machine or on a mainframe computer and the sender gets the mail for example directly through logging-in, for example through telnet, then preferably the receiving mail server informs the sender and/or the sending mail server that the message has been forwarded to the receiver at the moment that the servers adds the message to the user's messages Box, and preferably the software that allows the user to later access the message preferably also sends a confirmation to the server when the user actually opens the mail message. Preferably this is done with a resident software or driver that ensures that the server is informed whenever the message is accessed, so that tempering with the client software cannot prevent notifying the server. Similarly, if the mail is for example on a mailbox web service, such as for example yahoo.com or hotmail.com, then preferably the receiving mail server informs the sender and/or the sending server that the message has been received as soon as it stores the message at the appropriate mailbox, and preferably when the receiver accesses the server and opens the message, the server preferably automatically sends another message to the sender, confirming that the message has been read. In these cases too preferably the sender can also query the server at least for a certain period to find if the message has already been opened or not. Another possible variation is that in any of the above variations there is also another type of indication—if the user saw the header of the message, even if he didn't open it, which is preferably also sent to the sender and/or to the sending mail server. This additional indication can be done for example by the software that allows the user to access the messages, or for example different opening keys are needed for the header and for the content of the message. Another possible variation is that the sending mail server and/or the receiving mail server automatically add an HTML code to the message that when executed makes the client mail program immediately connect to some address on the mail server, thus automatically confirming that the message has been opened. Using such an HTML link in the message that connects to some intermediary $3^{rd}$ party's server along the way has been used already as an email-tracing method. However that is less convenient since in that case the user has to send the message in coordination with some third party. The preset variation is better since it makes this an internal element in the mail protocol, preferably using automatically at least the sender's side mail server and/or the receiver's side mail server. The above features for confirming receipt of the mail or at least some of them can be for example applied automatically for any email, or for example applied only if the user marks the message as "certified email". If payment is required for certified email, then preferably this is in the form of micro-payments, preferably charged directly from the sender's ISP, or for example the ISP charges just a little more for ISP services that allow using certified email and thus enables free use of certified email for example to users that are subscribed to it. Of course when the message is sent through a trusted authority, the authority can also similarly use any of the above methods to ensure that the receiver has indeed received the message. Another possible variation is that a copy of the message is sent in parallel also to a trusted authority for example for keeping a full log of the content without the need to route the message through the authority, if any of the above methods are used to sufficiently ensure that the message indeed has been received by the receiver. Of course, various combinations of the above and other variations can also be used.

While the invention has been described with respect to a limited number of embodiments, it will be appreciated that many variations, modifications, expansions and other applications of the invention may be made which are included within the scope of the present invention, as would be obvious to those skilled in the art.

What is claimed is:

1. A method for secure delivery or receipt of electronic messages, comprising:
    a) registering a user as a subscribing user;
    b) maintaining a web server for preventing receipt of electronic messages associated with malicious software, said server configured to: receive electronic messages sent to subscribing users; to authenticate the IP address of a sender of said electronic messages; and to refuse to relay said electronic messages to a receiving subscribing user until said authentication is complete:
        wherein said authentication is performed by said web server sending an automated message to said IP address, and said server receiving an acknowledgement message stating that said IP address exists;
        wherein, upon delivery of said electronic messages, said web server is configured to send to said sender a confirmation that said electronic messages have been relayed to said receiving subscribing user, said confirmation comprising: a serial number of said electronic messages with a time and a date stamp, or a digital key based on a unique signature of said web server; and
        wherein each relay server or router participating in delivery of said electronic messages is configured to add a unique signature with an encrypted time and date stamp to packets comprising said electronic messages, and said each relay server or router is configured to prevent relay of packets having an incorrect signature.

2. The method of claim 1, wherein said authentication of said IP address of a sender is performed by said server requesting a code or requesting the exact time when the message was generated.

3. The method of claim 1, wherein said authentication of said IP address of a sender is performed by said server checking whether the electronic message or the packets that comprise the electronic message include a confirmation of said IP address of said sender; said confirmation added by the Internet Service Provider of said sender.

4. The method of claim 1, wherein said authentication of said IP address of a sender is performed by said server checking whether the IP address indicated on an electronic message correlates to the geographical location from which the message was sent.

5. The method of claim 1, wherein said authentication of said IP address of a sender is performed by said server checking that the phone number from which the sender connected to the Internet correlates with a list of authenticated phone numbers related to known senders.

6. The method of claim 5, wherein if said server detects that said phone number or said indicated IP address related to said phone number, change more than a predetermined amount of times during a session, the server is configured to automatically block relay of electronic messages from said IP address or from said phone number.

7. The method of claim 1, wherein said authentication of said IP address of a sender is performed by a relay node returning a packet to a sender, then awaiting automatic confirmation from a sender that the initial packet was indeed sent by the IP address associated with the sender.

8. The method of claim 1, wherein the confirmation includes the content of said delivered electronic message.

9. The method of claim 1, wherein the confirmation includes a fingerprint of the content.

10. The method of claim 1, wherein said confirmation is sent when the recipient viewed the header of the electronic message.

* * * * *